3,641,034
POLYMERS OF DIPYRIDYL
Myron S. Simon, West Newton, Mass., assignor to Polaroid Corporation, Cambridge, Mass.
No Drawing. Filed Sept. 2, 1969, Ser. No. 854,781
Int. Cl. C07d 31/42
U.S. Cl. 260—296 R          6 Claims

ABSTRACT OF THE DISCLOSURE

A new class of polymers is described in which the essential recurring structural unit corresponds to the formula

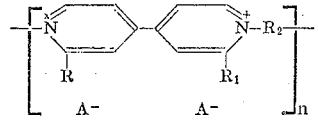

in which R and $R_1$ each are hydrogen or methyl, $R_2$ is either alkylene or $R_3$-phenylene-$R_4$ wherein $R_3$ and $R_4$ each are alkylene, $n$ is at least 2, and $A^-$ is anion.

---

This invention relates to new polymeric products and, more particularly, to polymeric dipyridylium compounds.

One object of the present invention is to provide novel 4,4′-dipyridylium polymers.

Another object is to provide 4,4′-dipyridylium polymers useful as electrochromic materials.

A further object is to provide such polymers useful in the fabrication of light polarizers.

Still other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description.

According to the present invention, new polymers are provided which are represented by the following structural formula:

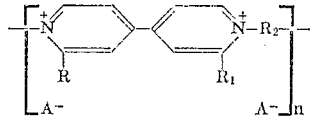

wherein R and $R_1$ each are hydrogen or methyl, $R_2$ is alkylene or $R_3$-phenylene-$R_4$, wherein $R_3$ and $R_4$ each are alkylene, $n$ is at least 2 and $A^-$ is an anion, e.g., $Cl^-$, $Br^-$, $I^-$, $BF_4^-$, $SO_4^-$, $ClO_4^-$ and tosyl.

The above polymeric products are obtained by reacting a 4,4′-dipyridyl and a quaternizing agent, for example, an α,ω-dihaloalkane. Preferably, the polymers are prepared by refluxing the 4,4′-dipyridyl and quaternizing agent in an inert organic solvent and an inert atmosphere until the polymeric products precipitate from the solution.

The polymerization reaction proceeds according to the following chemical equation:

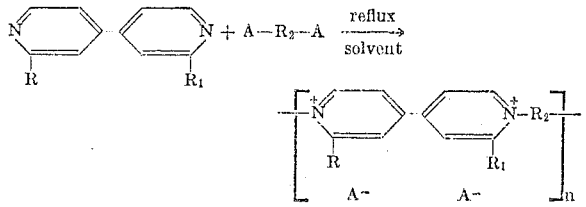

The reactants are all well-known compounds and are readily prepared by conventional methods. For example, the 4,4′-dipyridyls can be prepared by oxidizing the corresponding pyridine metal compounds in a solvent. Quaternizing agents, such as the α,ω-dihaloalkanes can be prepared by the cleavage of ethers, e.g., tetrahydrofuran with halosilanes, e.g., tetrabromosilicane or trichloroethylsilicane.

In carrying out the process, it is convenient to use an inert organic solvent, such as 3-heptanone or 2-methoxyethanol, or other higher ketone, ether or alcohol having a boiling point above about 75° C. and preferably between about 125° C. and 200° C. If the precipitated polymer is separated from the solvent while the solvent is hot, much of the non-quaternized material remains in solution thereby allowing isolation of a relatively pure product from the reaction mixture. The polymer may be separated from the solution by filtration or in any other suitable and convenient manner. If desired, the polymeric product may be fractionally reprecipitated from water with a non-solvent such as acetone, ethanol, etc.

The anions in the final product can be changed in certain cases, for example, by mixing an aqueous solution of the polymer having a halide anion with an aqueous solution of a silver salt of the desired anion. Silver halide precipitates out of solution, and the polymer contains the new anion.

It has been found that polymers of the above formula wherein $R_2$ is selected from alkylene containing from 4 to 8 carbon atoms and xylylene are especially useful as electrochromic materials, i.e., they will exhibit a reversible change in spectral absorption characteristics in an electrical field upon the alternate addition and loss of electrons. While they are insoluble in most organic solvents, they are soluble or at least swollen in water. Films may be prepared by dissolving the polymer in water to obtain a solution containing, for example, 25% of polymer and thereafter casting the solution on a smooth surface, such as a glass plate. The films, thus prepared, may be used as light-filtering layers in a light filter, and when molecularly oriented, they may be used as light polarizers. The films are conveniently oriented by rubbing them in one direction with polished wood or a polished steel burnishing tool until they are clear. The uses of the polymeric products and films prepared therefrom are described in copending application Ser. No. 854,522 of Howard G. Rogers filed on Sept. 2, 1971.

The following examples are given to illustrate the present invention and are not intended to limit the scope thereof.

EXAMPLE 1

A solution of 4,4′-dipyridyl (3.9 g.) and 1,8-dibromooctane (6.8 g.) was refluxed in 175 ml. of 3-heptanone under nitrogen for 3 hours. The product was collected as a precipitate and weighed 3.5 g. It can be fractionally reprecipitated from $H_2O$ by adding acetone.

EXAMPLE 2

A solution of 3.9 gm. 4,4′-dipyridyl and 5.4 g. 1,4-dibromobutane in 175 ml. of dry 2-methoxy ethanol was refluxed and stirred under nitrogen for 5 hours. The precipitated product was filtered off while hot, washed with 2-methoxy ethanol and then acetone. The product was dried in vacuo. Yield 2.5 gm.

EXAMPLE 3

7.8 gm. 4,4′-dipyridyl were dissolved in 100 ml. 3-heptanone and 13.29 gm. α,α′-dibromo-p-xylene in 50 ml. heptanone and 50 ml. dioxane were added. The solution was refluxed under nitrogen for 3 hours, forming a yellow precipitate. The precipitate was filtered hot and washed with methyl alcohol.

EXAMPLE 4

1 gm. of the product in Example 1 was dissolved in 10 ml. $H_2O$. 10 ml. of a 10% aqueous solution of the silver salt of p-toluene sulfonic acid was added with stirring. Silver bromide precipitated from the solution and was removed by filtration. The polymer containing the tosyl anion in place of bromide was precipitated from the filtrate by the addition of acetone.

Since certain changes may be made in the above product and process without departing from the scope of the invention herein involved, it is intended that all matter contained in the above description shall be interpreted as illustrative and not in a limiting sense.

What is claimed is:

1. A polymer in which the essential recurring structural unit corresponds to the formula

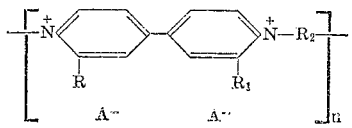

wherein R and $R_1$ each are selected from hydrogen and methyl, $R_2$ is selected from alkylene containing 4 to 8 carbon atoms and xylyene, $n$ is at least 2, and $A^-$ is an anion selected from the group consisting of $Br^-$, $Cl^-$, $I^-$, $BF_4^-$, $ClO_4^-$, $SO_4^{--}$ and tosyl, said polymer being produced by reacting a 4,4'-dipyridyl with an alkane having from 4 to 8 carbon atoms containing terminal halogen atoms or α,α-dihalo-p-xylene in the presence of an inert organic solvent under an inert atmosphere at refluxing temperatures.

2. A polymer according to claim 1 wherein R and $R_1$ are hydrogen and $A^-$ is $Br^-$.

3. A polymer according to claim 2 wherein $R_2$ is alkylene containing 4 carbon atoms.

4. A polymer according to claim 2 wherein $R_2$ is alkylene containing 8 carbon atoms.

5. A polymer according to claim 2 wherein $R_2$ is xylylene.

6. A polymer according to claim 1 wherein R and $R_1$ are hydrogen, $R_2$ is alkylene containing 8 carbon atoms and $A^-$ is tosyl.

References Cited
UNITED STATES PATENTS 3,049,547   8/1962   Cislak _____ 260—296 X ALAN L. ROTMAN, Primary Examiner U.S. Cl. X.R.

260—2, 294.8 R; 350—150